Jan. 12, 1937.  A. M. ROSS  2,067,206
WELDING ELECTRODE
Filed May 2, 1935
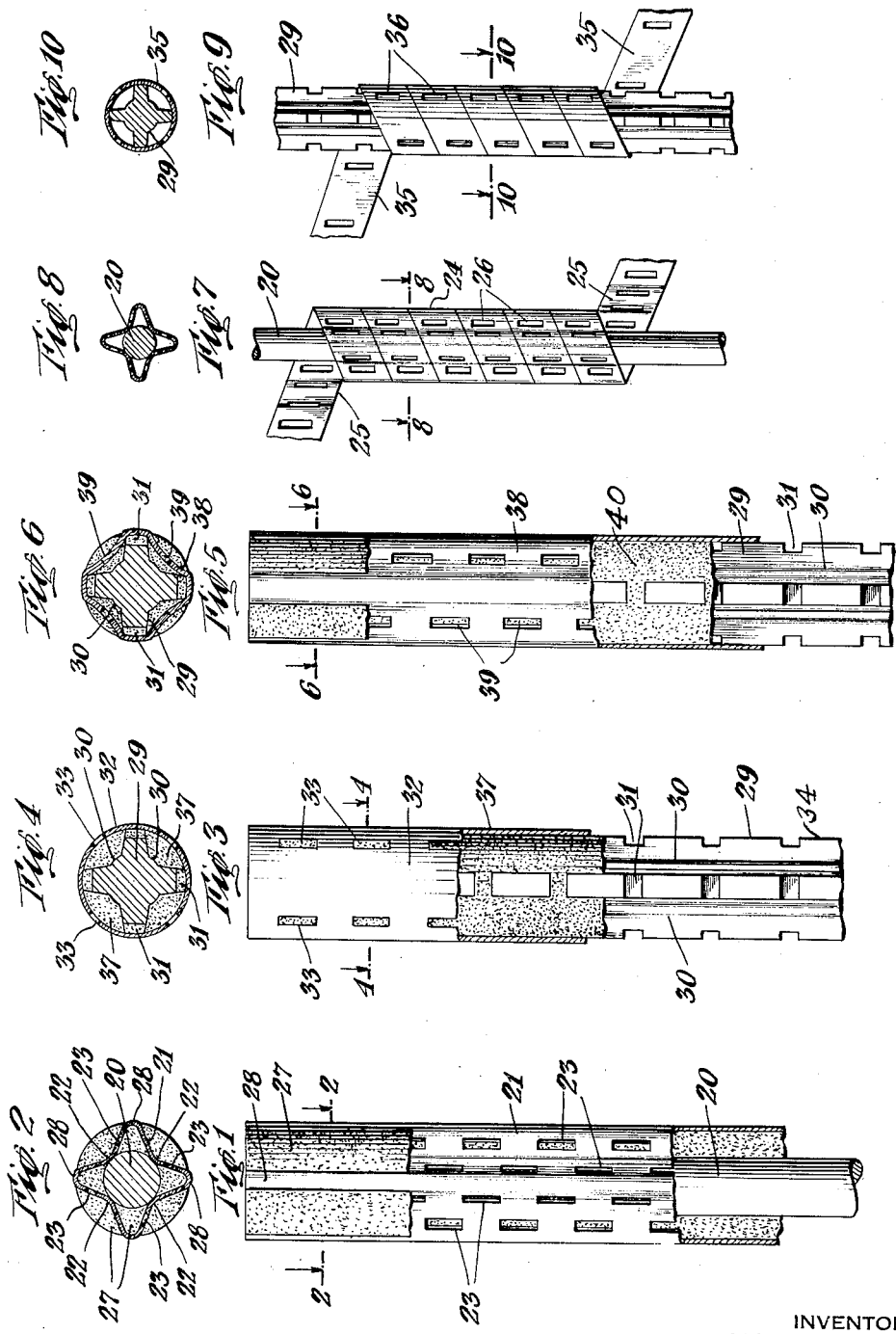
INVENTOR
Albert M. Ross
BY
Harold Kaplan
ATTORNEY Patented Jan. 12, 1937

2,067,206

UNITED STATES PATENT OFFICE 2,067,206

WELDING ELECTRODE

Albert M. Ross, New Britain, Conn.

Application May 2, 1935, Serial No. 19,343

17 Claims. (Cl. 219—8)

The present invention relates to electrodes for use in arc welding and more particularly to flux-coated electrodes.

The principal object of the present invention is to provide a flux-coated welding electrode which is adapted to provide continuous metallic contact with the electrode holder, thereby enabling it to be used effectively in both manual and automatic arc welding operations.

Another object of the present invention is to provide a welding electrode including a metallic core, fluxing material arranged on the core, and an outer metallic casing in electrical engagement with the core to permit conduction of the welding current thereto.

A further object of the present invention is to provide a flux-coated welding electrode which is enclosed in an outer metallic casing, but which is adapted to permit the flux to escape during the fusing of the electrode so that it does not become entrapped in the weld.

A still further object of the present invention is to provide a flux coated welding electrode of the character described in which the flux coating is evenly distributed throughout the length of the electrode and securely anchored to the electrode so that it may be bent or flexed without flaking or chipping off of the flux.

Other objects and advantages of the present invention will in part be pointed out hereinafter, and will in part be apparent to those skilled in the art to which the present invention relates.

In the construction of flux-coated welding electrodes, it has heretofore been the practice to wind a wire or cable in open spiral around the core of the electrode, or to form annular or helical grooves in the periphery of the electrode. The flux was then applied to the electrode in suitable manner and keyed thereto between the turns of the spiral winding or within the annular or helical grooves. The peripheral edge of the winding or the peripheral edges of the electrode, as the case may have been, was not covered by the flux so as to provide for metallic contact with the electrode holder. By means of such construction, however, there was provided only intermittent metallic contact between the electrode and the electrode holder, the contact points being separated by intervening layers of flux.

I have found that in order to obtain good results in high current speed welding, continuous metallic contact between the electrode and electrode holder is required. I accomplish this result by embodying a metallic casing with the electrode, the electrode being so constructed as to provide electrical contact between the core of the electrode and the casing and simultaneously providing a metallic periphery extending longitudinally of the electrode for continuous metallic contact with the electrode holder. The flux is applied to the electrode by an extrusion operation and is arranged between the core of the electrode and the casing and also on the outside of the casing in such manner that there is provided a uniform depth and even distribution of the flux. I prefer, also, to provide the casing with spaced perforations so that when the flux is extruded upon the electrode it will pass through the perforations and fill the spaces between the core of the electrode and the casing. When the electrode is being transfused, during the welding process, the perforations will permit the encased flux to escape so as not to become entrapped in the weld and form gas pockets therein. The perforations in the casing also provide means for anchoring the flux to the electrode by reason of the interlacing arrangement of the flux through the perforations.

The invention will be better understood by reference to the accompanying drawing forming an integral part of the specification, in which:

Fig. 1 is an elevation, partly in section, of a welding electrode constructed according to the present invention, the flux coating being partly broken away to show the perforations in the casing;

Fig. 2 is a cross-sectional view on line 2—2 of Fig. 1;

Fig. 3 is a view similar to Fig. 1 showing a modified form of a welding electrode constructed according to my invention;

Fig. 4 is a cross-sectional view on line 4—4 of Fig. 3;

Fig. 5 is a view also similar to Fig. 1 showing another modified form of welding electrode constructed according to my invention;

Fig. 6 is a cross-sectional view on line 6—6 of Fig. 5;

Fig. 7 is an elevation of the welding electrode shown in Fig. 1 illustrating a modified form of the construction of the casing.

Fig. 8 is a cross sectional view on line 8—8 of Fig. 7;

Fig. 9 is an elevation of the welding electrode shown in Fig. 3 showing a modified form of the construction of the casing.

Fig. 10 is a cross-sectional view on line 10—10 of Fig. 9.

Referring, now, to the drawing, wherein like reference characters indicate corresponding parts throughout the several views, directing attention first to the preferred embodiment of my invention shown in Figs. 1 and 2, 20 indicates a core round in shape and composed of any suitable metal or alloy. A longitudinally corrugated metallic casing or sheathing 21 is adapted to surround the core 20 so that the internal ridges 22 are in electrical contact with the core. The casing 21 is provided with a plurality of perforations 23 which are preferably arranged in staggered formation on opposite sides of the grooves of the corrugated sheathing 21. The corrugated sheathing 21 may be formed from suitable metal strip which is first perforated by any suitable method. The perforated strip and the core 20 are then simultaneously passed lengthwise through a suitable forming die which is adapted to form the perforated strip into a longitudinally corrugated sheathing around the core. The corrugated sheathing may also be formed as illustrated in Fig. 7, by spirally winding a metal strip 24 around the core 20. The metal strip 24 is provided with transverse corrugations 25 and perforations 26 so formed that when the metal strip 24 is wrapped around the core 20 the corrugations and perforations will be arranged in longitudinal alignment so as to form a sheathing substantially of the same structure as shown in Fig. 1.

The interior and exterior grooves of the corrugated sheathing 21 contain a flux 27 which may be composed of any suitable oxidizing or slag forming material. The flux does not cover the ridges 28 between the exterior grooves in order to provide clean metallic edges for continuous longitudinal contact with the electrode holder. The fluxing of the electrode may be accomplished by passing the sheathed core through a suitable receptacle containing the fluxing material in paste form and the flux may be applied under pressure. The pasty flux will thus be caused to enter into the interior grooves of the sheathing through the perforations in the sheathing and will fill the spaces between the core and the sheathing as well as the exterior grooves of the sheathing. The flux covered electrode may then be passed through a wiper which will remove any excess flux from the surface of the electrode so as to leave the longitudinal ridges 28 bare. The electrode thus produced may then be dried by any suitable drying means after which it may be cut into lengths for use in manual welding operations or coiled in a suitable manner for automatic welding operations.

In the modified construction illustrated in Figs. 3 and 4 of the drawing 29 indicates the core which is preferably provided with longitudinal grooves 30 and annular grooves 31 in the periphery thereof which may be formed by any suitable method. A metallic sheathing 32 which is provided with a plurality of spaced perforations 33 encircles the core 29 and engages the ridges 34 between the longitudinal grooves 30. The sheathing 32 may be formed around the core 29 in a manner similar to that described with reference to the construction shown in Figs. 1 and 2. The sheathing may also be formed in the manner illustrated in Fig. 9 by spirally wrapping a metal strip 35 having perforations 36 therein around the core 29. The perforations in the sheathing are arranged so as to register with the longitudinal grooves 30. The flux 37 is arranged and anchored within the grooves 30 and 31 in the periphery of the core and fills in the spaces between the core and the sheathing. The flux may be applied to the electrode by an extrusion operation similar to that hereinabove described.

In the modified embodiment of my invention illustrated in Figs. 5 and 6 I have combined the structure shown in Figs. 1 and 2 with the structure shown in Figs. 3 and 4. In this construction I employ a core 29 similar to that shown in Fig. 3 which is provided with longitudinal grooves 30 and annular grooves 31 in its periphery. A longitudinally corrugated sheathing 38, similar to the sheathing 21 in Fig. 1, is adapted to embrace the core 29 in such manner that the inner grooves of the corrugated sheathing engage the ridges between the longitudinal grooves 30 of the core 29. The internal ridges of the corrugated sheathing are preferably spaced from the core. The sheathing 38 is provided with perforations 39 which are arranged to register with the longitudinal grooves 30. The flux 40 is arranged within the grooves 30 and 31 of the core and within the exterior grooves of the corrugated sheathing 38 and may be applied to the electrode in the manner hereinabove described.

While the present invention generally comprises the combination and arrangement of parts hereinabove illustrated and described, it is to be understood that the invention is not limited to the specific embodiments shown and described, but certain changes in the details of construction are contemplated which will fall within the scope of the present invention as defined in the appended claims.

Having thus described and illustrated my invention what I claim as new and desire to secure by Letters Patent is:

1. A welding electrode comprising a grooved metallic core, a perforated metallic sheath embracing said core and in electrical engagement therewith, and fluxing ingredients disposed between the core and the sheath and extending through the perforations of the sheath.

2. A welding electrode comprising a grooved metallic core, a perforated metallic sheath embracing said core, the perforations of said sheath registering with the grooves of the core, and fluxing ingredients disposed within said grooves and extending through the perforations of the sheath.

3. A welding electrode comprising a metallic core having a plurality of substantially equally spaced longitudinally extending grooves in the periphery thereof, a perforated metallic sheath embracing said core, the perforations of said sheath registering with the grooves of the core, and fluxing ingredients disposed within said grooves and extending through the perforations of the sheath.

4. A welding electrode comprising a metallic core having a plurality of substantially equally spaced longitudinally extending grooves in the periphery thereof, a metallic sheath embracing said core and in electrical engagement therewith, said sheath being provided with a plurality of spaced perforations which are adapted to register with the grooves of the core, and fluxing ingredients disposed between the core and the perforated sheath and extending into the grooves of the core.

5. A welding electrode comprising a grooved metallic core, a perforated metallic member of indefinite length spirally wrapped around the core, the perforations in said spiral member being so formed as to register with the grooves of the core, and fluxing ingredients disposed within said grooves and extending through the perforations of the sheath.

6. A welding electrode comprising a metallic core having a plurality of substantially equally spaced longitudinally extending grooves in the periphery thereof, a perforated metallic member of indefinite length spirally wrapped around the core, said spiral member being so formed as to provide a wrapping having a plurality of spaced perforations registering with the grooves of the core, and fluxing ingredients disposed between the core and the perforated spiral wrapping, and extending into the grooves of the core.

7. A welding electrode comprising a metallic core, a longitudinally corrugated metallic sheath embracing said core and in electrical engagement therewith, and fluxing ingredients disposed within the grooves of said corrugated sheath, but not covering the ridges between the grooves.

8. A welding electrode comprising a metallic core, a longitudinally corrugated metallic sheath embracing said core and in electrical engagement therewith, said sheath being provided with a plurality of spaced perforations, and fluxing ingredients disposed within the internal and external grooves of said corrugated sheath, but not covering the ridges between the grooves.

9. A welding electrode comprising a metallic core, a corrugated metallic member of indefinite length spirally wrapped around the core, said spiral member being so formed as to provide a longitudinally corrugated wrapping around the core, and fluxing ingredients disposed within the internal and external grooves of said corrugated wrapping, but not covering the ridges between the grooves.

10. A welding electrode comprising a metallic core, a corrugated metallic member of indefinite length spirally wrapped around the core and in electrical engagement therewith, said spiral member being perforated so as to provide a longitudinally corrugated wrapping having a plurality of spaced perforations therein, and fluxing ingredients disposed within the internal and external grooves of said corrugated wrapping but not covering the ridges between the grooves.

11. A welding electrode comprising a metallic core having a plurality of substantially equally spaced longitudinally extending ribs on the periphery thereof, a longitudinally corrugated metallic sheath embracing said core, the ribs of the core engaging the internal grooves of the corrugated sheath, and fluxing ingredients disposed between the core and the corrugated sheath and within the external grooves of the corrugated sheath, but not covering the external ridges thereof.

12. A welding electrode comprising a metallic core having a plurality of substantially equally spaced longitudinally extending ribs on the periphery thereof, a longitudinally corrugated metallic sheath embracing said core, the ribs of the core engaging the internal grooves of the corrugated sheath, said corrugated sheath having a plurality of spaced perforations therein, and fluxing ingredients disposed between the core and the corrugated sheath and within the external grooves of the corrugated sheath, but not covering the external ridges thereof.

13. A welding electrode comprising a metallic sheath of indefinite length having a plurality of spaced perforations distributed along its length, and fluxing ingredients disposed within said sheath and extending through said perforations.

14. A welding electrode comprising a longitudinally corrugated metallic sheath of indefinite length having a plurality of spaced perforations distributed along its length, and fluxing ingredients disposed within said corrugated sheath and within the external grooves thereof but not covering the external ridges between the grooves.

15. A welding electrode comprising a longitudinally corrugated metallic sheath of indefinite length having a plurality of spaced perforations therein, and fluxing ingredients disposed within the internal and external grooves of said corrugated sheath and interlocking through said perforations.

16. A welding electrode comprising a metallic sheath of indefinite length having a plurality of spaced perforations distributed along its length, and fluxing ingredients disposed within said sheath.

17. A welding electrode comprising a metallic sheath of indefinite length having a plurality of spaced perforations distributed along its length, a metallic core within said sheath, and fluxing ingredients disposed between the core and the sheath.

ALBERT M. ROSS.